J. L. TOMER.
MECHANICAL MOVEMENT.
APPLICATION FILED FEB. 17, 1920.

1,361,646.

Patented Dec. 7, 1920.
2 SHEETS—SHEET 1.

Inventor
John L. Tomer,
By Bakewell, Byrnes & Parmelee
Attorneys

J. L. TOMER.
MECHANICAL MOVEMENT.
APPLICATION FILED FEB. 17, 1920.
1,361,646.
Patented Dec. 7, 1920.
2 SHEETS—SHEET 2.
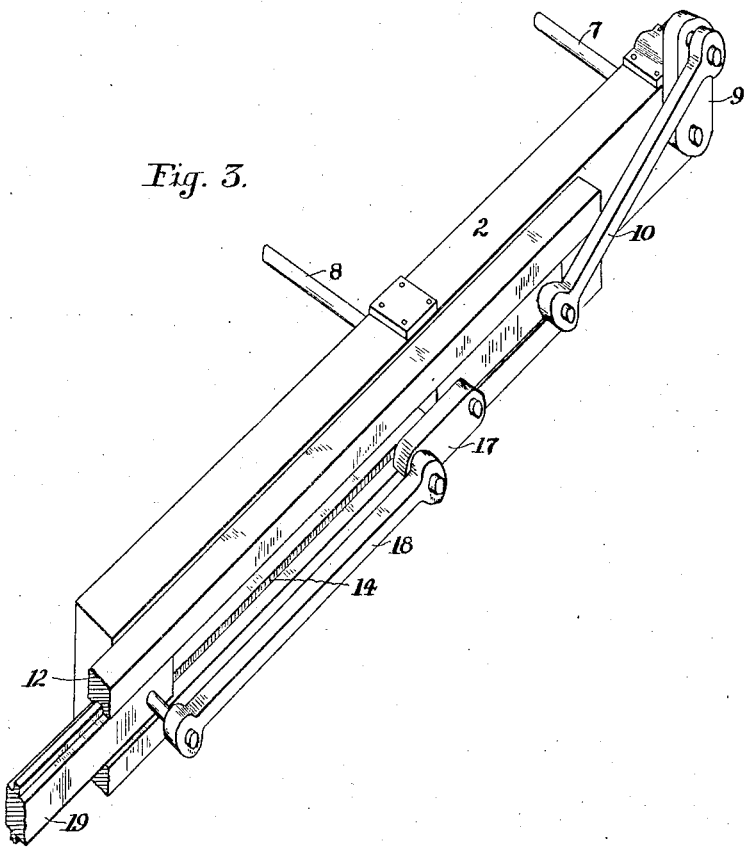
Fig. 3.
Fig. 4.
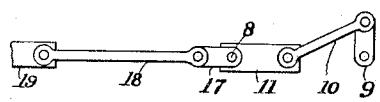
Fig. 5.
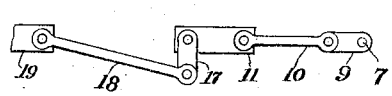
Fig. 6.
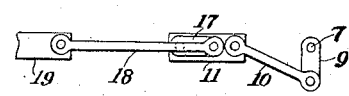
Fig. 7.
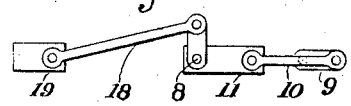
Inventor
John L. Tomer,
By Bakewell, Byrnes & Parmelee
Attorneys

UNITED STATES PATENT OFFICE.

JOHN L. TOMER, OF MURRYSVILLE, PENNSYLVANIA.

MECHANICAL MOVEMENT.

1,361,646.  Specification of Letters Patent.  Patented Dec. 7, 1920.

Application filed February 17, 1920. Serial No. 359,446.

*To all whom it may concern:*

Be it known that I, JOHN L. TOMER, a citizen of the United States, residing at Murrysville, Westmoreland county, Pennsylvania, have invented a new and useful Improvement in Mechanical Movements, of which the following is a full, clear, and exact description.

The present invention relates broadly to mechanical movements, and particularly to movements of this character comprising means for converting rotary into reciprocatory motion, or vice versa.

The principal object of the present invention is to provide a mechanical movement comprising a reciprocatory member with means whereby the length of stroke thereof may be readily varied within predetermined limits.

Another object of the present invention is to provide a mechanical movement comprising a uniformly rotating mechanism and reciprocatory member connected thereto in such manner that the member may be given periods of rest alternately with periods of comparatively rapid reciprocation.

A further object of the invention is to provide a plurality of cranks or rotary elements driven continuously and at a uniform speed, and so connected to a reciprocatory member that the stroke thereof may be lengthened or shortened as desired.

A still further object of the invention is to provide a member reciprocated by a plurality of cranks or rotary elements, one of which modifies the action of the other.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Fig. 3 is a perspective view of a portion of the mechanism, and

Figure 1:
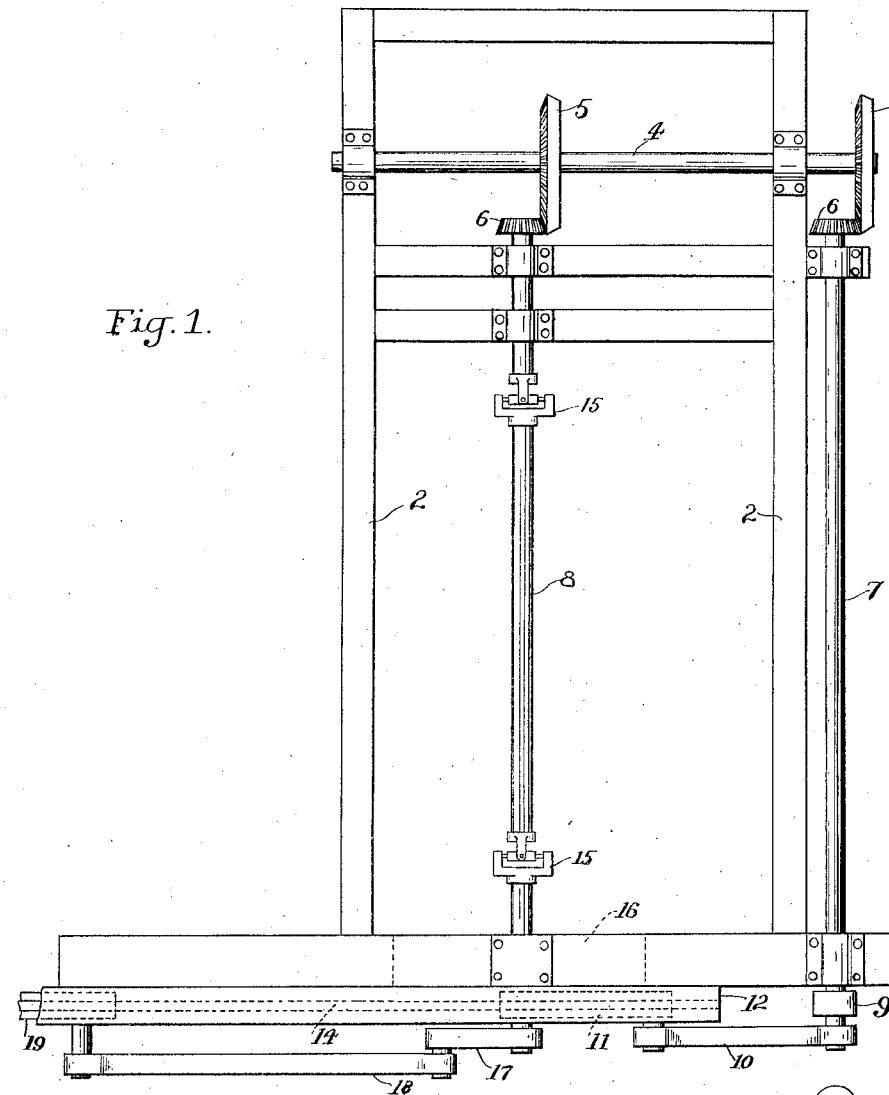
Figure 1 is a plan view of one embodiment of the present invention.
Figure 2:
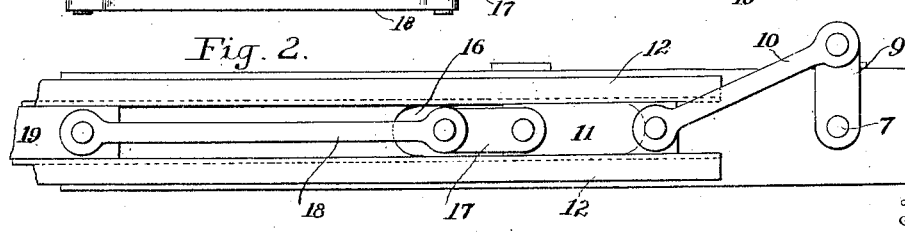
Fig. 2 is an end view of the construction illustrated in Fig. 1.

Figs. 4, 5, 6, and 7 are diagrammatic views illustrating one method of operation of the invention.

Referring more particularly to the drawings, there is provided a suitable supporting frame 2 in which may be journaled a driving shaft 4 carrying suitable gears 5 meshing with similar gears 6 on the shafts 7 and 8, respectively.

The shaft 4 may be driven in any desired manner by suitable mechanism (not shown), the mechanism preferably being such that the shaft is rotated continuously and at a uniform speed. Carried by one end of the shaft 7 is a rotary element 9, illustrated as being in the form of a crank, for operating the pitman 10. The opposite end of the pitman is operatively secured to a cross head 11 slidable in the guides 12 secured to the frame 2 and provided with suitable guideways 14. It will be apparent that upon rotation of the shaft 7, the cross head 11 will be reciprocated in the guideways.

The shaft 8 is provided with one or more universal joints or connections 15, preferably secured to the shaft with a sliding fit so that the effective length thereof may be slightly increased or diminished during the operation of the device. The front end of the shaft 8 extends through a slot 16 in the frame 2 and is journaled in the sliding cross head 11. Connected to the shaft 8 is a second rotary element 17 for operating the pitman 18. The opposite end of the pitman 18 is operatively connected to a reciprocatory member 19.

As illustrated in the drawings, the rotary elements 9 and 17 are offset approximately 90 degrees one from the other. Due to this arrangement, as clearly illustrated in Figs. 4 to 7, the action of the rotary element 9 modifies the action of the rotary element 17 by changing the axis of rotation thereof. Assuming the rotary elements to be in the position illustrated in Fig. 4 and rotating in a counter clockwise direction, it will be apparent that for a quarter of a revolution during which the parts move to the position shown in Fig. 5, the pitman 10 will be moved ahead at the same rate of speed as the pitman 18 is drawn backwardly, assuming the cranks 9 and 17 to be of the same length. During this time the reciprocatory member 19 will remain stationary.

During the next quarter of a revolution, in which the parts move to the position shown in Fig. 6, both of the pitmen will be drawn in the same direction, thereby reciprocating the member 19 at a comparatively high rate of speed. During the next quarter of a revolution to the position shown in Fig. 7, the pitman 10 will be drawn backwardly at the same rate of speed that the pitman 18 is forced ahead, thereby imparting no movement to the reciprocatory member 19. During the last quarter of a revolution to the initial position, both of the pitmen will be effected simultaneously for reciprocating the member 19 to the left as viewed in the drawings. From the foregoing it will be obvious that the member 19 is given periods of rest alternating with periods of comparatively rapid reciprocation. The amount of reciprocation generally may be varied at will by changing the amount by which one of the rotary elements is offset relatively to the other. It has been found that a construction of this type is highly desirable in certain machines such, for example, as mowing machines. In such cases the reciprocatory member 19 is connected in any desired manner to the knife head, not shown, so that during the cutting periods of the knife it moves very quickly thereby producing a much smoother cut. By my improved mechanism the same number of reciprocations are imparted per unit of time but as these reciprocations are alternated with periods of rest, there is comparatively little vibration imparted to the machine.

The advantages of the present invention arise from a construction in which one of the rotary elements modifies the operation of the other by automatically changing the axis of rotation thereof.

Further advantages arise from a construction permitting ready adjustment of the length of stroke of the reciprocatory member, which member may be operated to provide alternate periods of rest and reciprocation.

I claim:

1. A mechanical movement, comprising a plurality of cranks, means for actuating said cranks, and reciprocatory members connected to each of said cranks, one of said members carrying one of the cranks, substantially as described.

2. A mechanical movement, comprising a plurality of cranks, means for continuously actuating said cranks and reciprocatory members connected to each of said cranks, one of said members carrying one of the cranks, substantially as described.

3. A mechanical movement, comprising a plurality of cranks disposed at an angle one to the other, means for actuating said cranks, and reciprocatory members connected to each of said cranks, one of said members carrying one of the cranks, substantially as described.

4. A mechanical movement, comprising a crank, means for rotating the same, a pitman connected to said crank, a cross head actuated by said pitman, a second crank carried by said cross head, means for rotating the same, a second pitman connected to said second crank, and a reciprocatory member actuated thereby, substantially as described.

5. A mechanical movement, comprising a crank, means for continuously rotating the same, a pitman connected to said crank, a cross head actuated by said pitman, a second crank carried by said cross head, means for continuously rotating the same, a second pitman connected to said second crank, and a reciprocatory member actuated thereby, substantially as described.

6. A mechanical movement, comprising a crank, means for rotating the same, a pitman connected to said crank, a cross head actuated by said pitman, a second crank carried by said cross head, means for rotating the same, a second pitman connected to said second crank, a reciprocatory member actuated by said second pitman, and guides for said cross head and said member, substantially as described.

7. A mechanical movement, comprising a rotary element, a cross head operatively connected thereto, a second rotary element carried by said cross head, and a reciprocatory member operatively connected to said second rotary element, substantially as described.

8. A mechanical movement, comprising a plurality of rotary elements, means controlled by one of said elements for changing the axis of rotation of the other of said elements to increase or decrease the distance between the axes of rotation of said elements, a reciprocatory member, and means controlled by the rotary element having a changeable axis of rotation for imparting a reciprocatory movement to said member independent of the change in its axis of rotation, substantially as described.

9. A mechanical movement, comprising a plurality of rotary elements, means controlled by one of said elements for changing the axis of rotation of the other of said elements to increase or decrease the distance between the axes of rotation of said elements, a reciprocatory member, and means controlled by the rotary element having a changeable axis of rotation for imparting a reciprocatory movement to said member independent of the change in its axis of rotation, said means being effective during a portion of the rotation of said element for reciprocating, and effective during other portions of the rotation thereof for maintaining said member stationary, substantially as described.

10. A mechanical movement, comprising a reciprocatory member, a rotary element operatively connected thereto, means connected to said member for reciprocating the same to change the axis of rotation of said rotary element by increasing or decreasing the distance from said means, and a second reciprocatory member operatively connected to said rotary element, substantially as described.

In testimony whereof, I have hereunto set my hand.

JOHN L. TOMER.